United States Patent [19]
Jackson

[11] 3,945,875
[45] Mar. 23, 1976

[54] METHOD FOR OBTAINING POLYESTER LAMINATES AND SAID LAMINATES

[75] Inventor: William E. Jackson, Akron, Ohio

[73] Assignee: The Goodyear Tire & Rubber Company, Akron, Ohio

[22] Filed: Feb. 2, 1972

[21] Appl. No.: 222,970

Related U.S. Application Data

[63] Continuation of Ser. No. 838,324, July 1, 1969.

[52] U.S. Cl. .............. 156/308; 156/315; 156/332; 156/331; 260/75 NP; 260/77.5 AM; 427/407; 428/424; 428/480
[51] Int. Cl.² .......................................... C09J 5/02
[58] Field of Search ........... 156/308, 314, 315, 331, 156/110 A, 310, 332; 260/75 NP, 75 NT, 77.5 AM, 870; 117/DIG. 7; 161/232, 233

[56] References Cited
UNITED STATES PATENTS

| | | | |
|---|---|---|---|
| 2,606,892 | 8/1952 | Kropa et al. | 260/80.3 |
| 2,905,582 | 9/1959 | Coleman et al. | 156/314 X |
| 3,396,063 | 8/1968 | Massoubre | 156/331 |
| 3,463,698 | 8/1969 | Yanagihara et al. | 161/186 |
| 3,505,252 | 4/1970 | Brotherton et al. | 260/2.5 |
| 3,526,572 | 9/1970 | Finelli | 161/183 |
| 3,546,041 | 12/1970 | Burns et al. | 156/308 |
| 3,642,553 | 2/1972 | Georges | 156/308 |

*Primary Examiner*—William A. Powell
*Assistant Examiner*—J. J. Gallagher
*Attorney, Agent, or Firm*—F. W. Brunner; J. D. Wolfe

[57] ABSTRACT

This invention relates to a method for obtaining improved adhesion in the preparation of polyester laminates by treating the surface with an isocyanate containing ethylenic unsaturation and then applying a polyester adhesive containing a peroxide curing agent and to the said laminates.

6 Claims, No Drawings

METHOD FOR OBTAINING POLYESTER LAMINATES AND SAID LAMINATES

This is a Continuation, of application Ser. No. 838,324 filed July 1, 1969.

This invention relates to an improved method of obtaining adhesion between polyester compositions per se. More specifically, this invention relates to a method of modifying the surface of a polyester composition which may contain glass fiber reinforcement to obtain a better bond to the polyester composition with the polyester-peroxide type adhesive.

Heretofore, in making laminates between polyester compositions per se it has been customary to clean the surface to be bonded by shot blasting to expose fresh surfaces and to remove the surface contamination. This treatment necessarily results in reduction of size of the shot blasted piece and also effects the surface contour. It should be readily evident that the use of a sandblasting or a mechanical abrading treatment increases the cost and also presents problems due to the contamination of the surrounding area with the fines from the sandblasting treatment or mechanical abrading.

Therefore, it is an object of this invention to provide an improved method for obtaining adhesion between polyester compositions per se with an adhesive of the polyester-peroxide type composition. This object and other advantages may be obtained by the practice of this invention, as will be evident from the following discussion.

The surface of the polyester composition is subjected to a treatment with a suitable treating agent preferably dissolved in a solvent, removing the excess treating agent, if any, and then applying a suitable polyester peroxide adhesive for the polyester composition, to the surface to be bonded or laminated and allowing the polyester-peroxide adhesive to set and cure.

More specifically, the polyester compositions are those utilized for constructing panels or built-up objects of substantial rigidity, for instance, the use of polyester compositions containing glass fiber reinforcements such as those used in making automobile bodies or parts, boats, and related objects are the ones to which this invention has its primary benefit. These polyester compositions may be made by reacting suitable polycarboxylic acids or their anhydrides with suitable glycols such as ethylene or the other glycols of 3 to 20 carbon atoms. For these purposes the polycarboxylic acids of the aromatic type are particularly suitable as they tend to give a more rigid composition. Representative examples of these aromatic polycarboxylic acids are phthalic, isophthalic and terephthalic. Also, unsaturated polycarboxylic acids such as the representative members, maleic and fumaric, are utilized where it is desired to introduce a small to a relatively large amount of unsaturation in the polyester composition, especially where the composition is to be cured or set by peroxide curing, either alone or in conjunction with an unsaturated monomer or alpha olefin of 2 to 20 carbon atoms such as styrene or acrylonitrile, etc. The nature of these polyester compositions are given in "The Handbook of Reinforced Plastics" of the Society of the Plastic Industry, edited by Samuel Oleesky and J. Gilbert Mohr.

The glass fiber reinforced polyester compositions are well known and are used widely but in general these compositions are prepared by forming a copolymer containing maleic anhydrides or related unsaturated polycarboxylic acids and one of the phthalic acids or lower aliphatic dicarboxylic acid with ethylene glycol or related glycols.

The treating agent for modifying the surface of the polyester composition is at least bifunctional and contains in its simplest form at least one isocyanate group and at least one ethylenic unsaturated group. Representative materials are the mono, di and higher isocyanates which contain at least one double bond. Representative examples of these are allyl isocyanate, butylene isocyanate and the higher unsaturated monoisocyanates. Also, the isocyanates containing ethylenic unsaturation obtained by reacting a diisocyanate or polyisocyanate with an unsaturated reactive hydrogen compound of about 90 to 500 or even 6 to 10,000 in molecular weights to yield an isocyanate terminated adduct having at least one ethylenic carbon-to-carbon bond for each 1000 and preferably for each 100 units of molecular weight.

The polyester composition, preferably in the form of a sheet or thin film, is treated with the treating agent by applying the treating agent, preferably from a solvent, to the surface by brushing, spraying, rolling or other suitable techniques, then allowing the treating agent to react with the polyester composition, i.e. the free hydroxyls or carboxyls thereof, either at room temperature or preferably at elevated temperatures such as 100°F. to 300°F., which would more readily remove the solvent. Then the polyester whose surface has been modified is treated with a polyester adhesive containing an organic peroxide and the two surfaces to be joined are placed in contact and maintained there until the adhesive has had time to laminate or bond the two compositions together. Sometimes it is desirable to remove any excess isocyanate which may remain on the surface of the polyester in an unreacted condition by subjecting the surface to a suitable washing action with a suitable solvent before applying the polyester-peroxide adhesive to the surface.

Suitable solvents for washing the surface of the polyester composition and the metals are those such as methyl ethyl ketone, acetone, ethylene dichloride, methylene chloride, chloroform, toluene, benzene, xylene, the aliphatic hydrocarbons, coal tar and petroleum napthas, and chlorinated solvents and napthas. It is preferred that the solvent boil below about 350°F. and usually no higher than 300°F.

The nature of this invention may be more specifically exemplified by the following representative examples wherein all parts are by weight unless otherwise indicated and FRP designates a polyester reinforced with fiber glass.

EXAMPLE I

To show the current state of the art and provide a base line for the FRP stock (FRP is used to designate a commercial grade of fiberglass reinforced polyester) and polyester adhesive being used, the following bonds were made and tested.

Six pieces of FRP test stock (The MFG Company's test stock, cut in 1 ×3×0.10 inch pieces) were wiped clean with "Kimwipe" or related paper tissues soaked in methyl ethyl ketone. Six other pieces were shot blasted to remove all surface gloss. Each set of six pieces were then bonded in pairs to form two sets of three tensile cross bonds, using The MFG Company's Number 131 polyester bond adhesive (catalyzed with 6 percent methyl ethyl ketone peroxide). When the adhesive was observed to be gelling, the excess adhesive was trimmed from the edges of the bond with a rubber knife to permit clamping in the close fitting tensile test fixture. After an overnight wait at room temperature these bonds were pulled apart with standard tensile test fixture with the following results:

| Sample | Tensile, psi | Remarks on Nature of Bond Failure |
| --- | --- | --- |
| MEK wipe only | 27 | 100 % Surface Separation |
| MEK wipe only | 27 | 100 % Surface Separation |
| MEK wipe only | 27 | 100 % Surface Separation |
| Shot blasted | 276 | Light fiber tear-probably 100% |
| Shot blasted | 262 | 100% fiber tear-not deep all over |
| Shot blasted | 258 | Very light fiber tear |

EXAMPLE II

To a bottle was added and mixed in order the following materials:

| | |
| --- | --- |
| Polylite 31-822* | 1 part |
| Methyl ethyl ketone (dried over "Drierite") | 99 part |
| Mobay's Mondur MR** | 3.6 part |
| Rubber Oil Red "O" dye | 0.0001 part |

*Unsaturated polyester resin available from Reichold Chemical Company, which analyzes 249 hydroxyl number, 44 acid number for estimated active hydrogen equivalent weight of 192.
**Polymethylene poly(phenyl isocyanate) having average functionality of approximately 2.7, equivalent weight of 132. Used at approximately 1 mole per active hydrogen equivalent in the polyester.

The resulting solution is bright and clear and nonclouding.

Ten pieces of FRP test stock were wiped with a "Kimwipe" tissue soaked in the above solution, leaving a visible film of material on the FRP surface. After about an hour (more than ample time for the solvent to evaporate) the pieces were bonded into 5 tensile crosses using MFG's Number 131 polyester bond as in Example I. After trimming, three of these bonds were, within an hour, given a 1 hour bake at 275°F. (simulating the effect of paint bake cycles). The other two bonds were held at room temperature overnight and then baked at 275°F. Bond strength test results were as follows:

| Immediate Bake Tensile, psi | Delayed Bake Tensile, psi | Comments - Bond Failure |
| --- | --- | --- |
| 100 | | 100% I (p-s)*** |
| 161 | | 100% I (p-s) |
| 340 | | Deep fiber tear |
| | 290 | 100% deep fiber tear |
| | 244 | 10% fiber tear, 90% surface separation with fracture lines |

***I (p-s) signifies apparent interfacial failure, between primer and substrate.

EXAMPLE III

To a bottle was added and mixed in order the following materials:

| | |
| --- | --- |
| Arochem 640* | 1.75 part |
| Methyl ethyl ketone (dried over "Drierite") | 98.25 part |
| Mobay's Mondur MR | 3.7 part |
| Rubber Oil Red "O" dye | 0.0001 part |

*Unsaturated polyester resin (supplied by Ashland Chemical Company) which analyzes 150 hydroxyl number and 16 acid number for an estimated active hydrogen equivalent weight of 338.

The resulting solution is bright and clear and nonclouding.

This solution was applied to ten FRP panels as in Example II and the panels bonded into tensile crosses with MFG's Number 131 polyester bond as in Example I. Treatment and testing was the same as in Example II. Bond strength test results were as follows:

| Immediate Bake Tensile,psi | Delayed Bake Tensile,psi | Comments - Bond Failure |
| --- | --- | --- |
| 276 | | Deep fiber tear - shows 40% surface separation |
| 216 | | 100% I (p-s) with bad fracture lines in FRP |
| 312 | | Deep fiber tear - shows some surface separation |
| | 322 | 100% deep fiber tear - opposite panel reveals 30-40% surface separation under loose fibers |
| | 317 | 100% deep fiber tear - opposite panel as above. |

EXAMPLE IV

To a bottle was added and mixed in order the following materials:

| | |
| --- | --- |
| Reichhold's Polylite 31-822 | 1 part |
| Methyl ethyl ketone (dried over "Drierite") | 99 part |
| Mobay's Mondur TM* | 6.0 part |

*4,4',4'' triphenyl methane triisocyanate (267 MW), 20% solution. Used at approximately one mole per active hydrogen equivalent in the polyester resin.

The resulting solution is bright and clear and nonclouding.

The solution was applied to ten FRP panels as in Example II and the panels similarly bonded into tensile crosses with MFG's Number 131 polyester bond as in Example I. Treatment and testing was the same as in Example II. Bond strength test results were as follows:

| Immediate Bake Tensile,psi | Delayed Bake Tensile,psi | Comments - bond failure |
| --- | --- | --- |
| 184 | | I (p-s) with fracture of one panel surface |
| 143 | | I (p-s) slight fiber tear at edges |
| 188 | | I (p-s) with fracture of one panel surface |
| | 340 | 100% fiber tear |
| | 120 | I (p-s) |

EXAMPLE V

To a bottle was added and mixed in order the following materials:

| | | |
| --- | --- | --- |
| Crotyl alcohol | .375 | part |
| Methyl ethyl ketone (dried over "Drierite") | 99.625 | part |
| Mobay's Mondur MR | 3.6 | part |
| Rubber Oil Red "O" dye | 0.0001 | part |

The resulting solution is bright and clear and nonclouding.

This solution was applied to six FRP panels as in Example II, and after an overnight exposure to the atmosphere was bonded into three crosses with MFG's Number 131 polyester bond as in Example I. The trimmed bond specimens were left at room temperature overnight, then bonded one hour at 275°F., cooled and tested. Bond strengths were as follows:

| Tensile, psi | Comments - bond failure |
| --- | --- |
| 147 | I (p-s) |
| 299 | 75% deep fiber tear, 25% I (p-s) |
| 266 | 25% deep fiber tear, 75% I (p-s) with fracture lines in surface |

EXAMPLE VI

To a bottle was added and mixed in order the following materials:

| | | |
| --- | --- | --- |
| 1,5 hexadiene-2,4 diol | 0.6 | part |
| Methyl ethyl ketone (dried over "Drierite") | 99.4 | part |
| Mobay's Mondur MR | 3.6 | part |
| Rubber Oil Red "O" dye | 0.0001 | part |

The resulting solution is bright and clear and nonclouding.

This solution was applied to 10 FRP panels as in Example II and the panels bonded into tensile crosses with MFG's Number 131 polyester bond as in Example I. Treatment and testing was the same as in Example II. Bond strength test results were as follows:

| Immediate Bake Tensile,psi | Delayed Bake Tensile, psi | Comments Bond Failure |
| --- | --- | --- |
| 83 | | I (p-s) |
| 100 | | I (p-s) |
| 78 | | I (p-s) |
| | 83 | I (p-s) |
| | 64 | I (p-s) |

A second set of six panels were first wiped down with a solution of triethylene diamine (2% in methyl ethyl ketone) then treated with the above solution. After 15 minutes at room temperature, excess primer was wiped off with a MEK soaked tissue. The panels were then bonded with MFG's Number 131 polyester bond as in Example I. After trimming, the bonds were baked 1 hour at 275°F., cooled and tested with the following results:

| Tensile,psi | Comments - Bond Failure |
| --- | --- |
| 253 | Surface separation with some drastic fracture of surface |
| 221 | 100% surface separation with slight surface fracture |
| 248 | Surface separation with fracture lines in panel surface. |

EXAMPLE VII

To a bottle was added and mixed in order the following materials:

| | | |
| --- | --- | --- |
| Acrylonitrile-butadiene copolymer, OH terminated* | 8 | parts |
| Toluene (dry) | 92 | parts |
| Mondur MR | 3.6 | parts |
| Rubber Oil Red "O" dye | 0.0001 | part |

*Sinclair Petrochemical's PET 293-68, 2500-3000 molecular weight, 345 Iodine Number.

The resulting solution is bright and clear and nonclouding.

Bond specimens were prepared as in Example VI with the following results:

| Bonds prepared as in Example II-IV | | |
| --- | --- | --- |
| Immediate Bake Tensile, psi | Delayed Bake Tensile, psi | Comments - Bond Failure |
| 92 | | I (p-s) |
| 92 | | I (p-s) |
| 92 | | I (p-s) |
| | 92 | I (p-s) |
| | 92 | I (p-s) |

| Bonds prepared as in last part of Example VI | |
| --- | --- |
| Tensile,psi | Comments - Bond Failure |
| 244 | 30% deep fiber tear, balance surface separation |
| 280 | 10-15% scattered fiber tear, balance surface separation |
| 276 | 60% deep fiber tear, balance surface separation |

EXAMPLE VIII

Another set of FRP test panels was treated by coating the surface with melted bis(2-isocyantoethyl) fumarate and the panel was maintained in an oven at 250°F. for 2–3 hours to permit the bis(2-isocyantoethyl) fumarate to melt and become chemically bonded with the panel surface. Then the set of panels was removed from the oven, allowed to cool and washed with toluene to remove any excess or free bis(2-isocyantoethyl) fumarate. Each of these sets of panels were then treated with an adhesive comprising a pasty polyester of the type of which the panel was made containing also some styrene (i.e.-a maleic anhydride-phthalic acid ethylene glycol(1:1:1) polyester) to make a paste.

This paste had mixed with it three parts of methyl ethyl ketone peroxide for each hundred parts of resin in the paste just prior to the time the paste was smeared on the panel. Each set of the panels was clamped and allowed to set and cure. Then the surface adhesion was determined by submitting the panels to an adhesion test. The panels treated in this manner withstood a pull of 258 pounds per square inch before failing.

EXAMPLE IX

Three parts of bis(2-isocyantoethyl) fumarate was dissolved in 97 parts of toluene to form a 3 percent by weight solution. One set of panels was allowed to stand at room temperature for four days in the open air and a second set of panels was allowed to stand at room temperature for four days in a closed jar free of atmospheric moisture. Then these two sets of panels were treated with the adhesive of Example VIII and allowed to cure and set and the adhesion test was run. The results are tabulated below:

| Test Specimen | Adhesion-Lbs/Sq In |
| --- | --- |
| First set of panels (open air) | 340 |
| Second set of panels (closed jar) | 299 |

Any of the organic peroxides may be used to cure the polyester adhesive. Representative of these are tertiary butyl peroxide, dicumylperoxide, and those peroxides shown in U.S. Pat. Nos., 2,429,587, 2,483,374 and 3,386,947. The peroxides available commercially as Dicup and Varox also may be used.

The organic isocyanates useful for reacting with unsaturated hydroxyl containing or reactive hydrogen containing materials to give an unsaturated treating agent are any of the organic isocyanates that are useful in the preparation of polyurethane foams or casting materials. It should be appreciated that the tertiary amine catalysts such as triethylene diamine or triethylene amine or the other tertiary alkyl amines that are useful as catalysts with the polyurethanes may be utilized in accordance especially with the teachings of Example VII to enhance the bond obtained in accordance with this invention. Also, the other polyurethane catalysts such as the metal salts, for example, of tin compounds and specifically such as the carboxylic acid salts of tin can be utilized advantageously in connection with the treating agent of the instant invention.

EXAMPLE X

A bright clear solution was prepared by reacting

|  | Parts |
|---|---|
| Diallylamine | 1 |
| Dry methyl ethyl ketone | 99 |
| Mondur MR | 3.5 |
| Rubber Oil Red ("O" dye) | .0001 |

Six pieces of polyester panels (FRP test panels) were wiped with the above treating solution and then after standing 30 minutes wiped with methyl ethyl ketone to remove the excess of treating solution. Then the panels were coated with MFG polyester bond containing six percent methyl ethyl ketone peroxide and formed in test crosses before baking 1 hour at 275°F.

These pieces required at least 156 pounds per square inch of pull to pull the cross apart.

EXAMPLE XI

When the diallylamine and ketone of Example X was replaced with maleic acid and toluene respectively and warmed to 160°F., a precipitate formed which left a clear solution on filtering. This filtrate was used to treat FRP test panels as in Example I and a pull of at least 250 pounds per square inch was required before the cross pieces were separated.

Similar results were obtained when the unsaturated acid, fumaric, was used instead of maleic acid.

EXAMPLE XII

A bright and clear solution was prepared by reacting

|  | Parts |
|---|---|
| Polyester (Arochem 640) | 1.75 |
| 4,4'-diphenylene methylene diisocyanate (MDI) | 2.8 |
| Dry methyl ethyl ketone | 98.25 |
| Rubber Oil Red "O" dye | 0.001 |

This solution was used to treat FRP test panels as per Example IX except the cross members were baked 1 hour at 275°F. before being subjected to pull tests. These bonds required at least 140 pounds per square inch pull before failure occurred.

While certain representative embodiments and details have been shown for the purpose of illustrating the invention, it will be apparent to those skilled in this art that various changes and modifications may be made therein without departing from the spirit or scope of the invention.

What is claimed is:

1. A method of forming a laminate of two specimens comprising treating the surface of a polyester specimen with an organic isocyanate containing ethylenic unsaturation, then applying a fluid adhesive comprising an organic peroxide curative and an unsaturated polyester to at least one of the specimens to be laminated, placing the treated polyester specimen in laminating relationship with the other specimen and curing the adhesive to bond the specimens together, said polyester specimen being the reaction product of a polycarboxylic acid or anhydride with a polyol.

2. The method of claim 1 wherein the peroxide has the formula

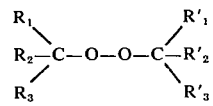

where $R_1$, $R'_1$, $R_2$, $R'_2$, $R_3$ and $R'_3$ are alkyl, aryl, or haloaryl and at least one R group can be peroxy alkyl.

3. The method of claim 1 wherein the compound used for treating the surface of the polyester specimen is the reaction product of an organic polyisocyanate with a reactive hydrogen material selected from the class of unsaturated carboxylic acid, unsaturated organic amines, unsaturated alcohol and unsaturated polyols.

4. The method of claim 1 wherein the treating compound is a reaction product of an organic polyisocyanate and diallyl amine.

5. The method of claim 3 wherein the reactive hydrogen material is an unsaturated polyester polyol.

6. The method of claim 3 wherein the reactive hydrogen material is said polyol and further is a hydroxyl terminated polybutadiene.

* * * * *